US012699579B2

(12) United States Patent
Kotov et al.

(10) Patent No.: US 12,699,579 B2
(45) Date of Patent: Aug. 4, 2026

(54) LOCATING VIRTUAL TAPE FILE SYSTEMS ON A VIRTUAL TAPE EMULATOR

(71) Applicant: Dell Products, L.P., Hopkinton, MA (US)

(72) Inventors: Yuri Kotov, Saint Petersburg (RU); Konstantin Neshin, Saint Petersburg (RU); Kirill Moiseevskikh, Saint Petersburg (RU)

(73) Assignee: Dell Products, L.P., Hopkinton, MA (US)

( * ) Notice: Subject to any disclaimer, the term of this patent is extended or adjusted under 35 U.S.C. 154(b) by 977 days.

(21) Appl. No.: 17/872,230

(22) Filed: Jul. 25, 2022

(65) Prior Publication Data

US 2023/0236865 A1      Jul. 27, 2023

(30) Foreign Application Priority Data

Jan. 25, 2022     (RU) ................................ 2022101634

(51) Int. Cl.
| | |
|---|---|
| *G06F 9/455* | (2018.01) |
| *G06F 3/06* | (2006.01) |
| *G06F 16/188* | (2019.01) |

(52) U.S. Cl.
CPC ........ *G06F 9/45558* (2013.01); *G06F 3/0664* (2013.01); *G06F 16/188* (2019.01); (Continued)

(58) Field of Classification Search
CPC .............. G06F 9/45558; G06F 16/188; G06F 2009/45583; G06F 3/0604; G06F 3/0664; G06F 3/0686; G06F 2009/45579
See application file for complete search history.

(56) References Cited

U.S. PATENT DOCUMENTS

| | | | | |
|---|---|---|---|---|
| 5,805,864 A | * | 9/1998 | Carlson ................. | G06F 3/0664 360/92.1 |
| 8,320,569 B2 | * | 11/2012 | Wideman ............ | H04L 63/0823 380/277 |

(Continued)

FOREIGN PATENT DOCUMENTS

| | | | | |
|---|---|---|---|---|
| WO | WO-2015167432 A1 | * | 11/2015 | ........... G06F 3/0631 |

OTHER PUBLICATIONS

Kroah-Hartman, G. (Jul. 2003). udev—A Userspace Implementation of devfs. In Proc. Linux Symposium (pp. 263-271). (Year: 2003).*

(Continued)

*Primary Examiner* — Akash Saxena
(74) *Attorney, Agent, or Firm* — Anderson Gorecki LLP

(57) ABSTRACT

Virtual tape emulation software on a Virtual Tape Emulator (VTE) assigns file systems labels based on the tape library name, the logical name of the storage array (from the VTE perspective), and the logical unit number (LUN) of the device on the VTE on which the file system is created. To prevent name conflicts within the VTE Operating System (VTEOS), a UDEV label translation process in the VTEOS creates a new label for the virtual tape file system that will be used by the VTEOS to identify the virtual tape file system. The label is created by concatenating the tape library ID, and the storage system identifier and the device identifier derived from the device World Wide Name (WWN). Since the label is unique within the VTE, UDEV label translation enables the VTEOS to differentiate between multiple replicated copies of the same virtual tape file system.

18 Claims, 10 Drawing Sheets

(52) U.S. Cl.
CPC .......... *G06F 3/0604* (2013.01); *G06F 3/0686* (2013.01); *G06F 2009/45583* (2013.01)

(56) References Cited

U.S. PATENT DOCUMENTS

| | | | | | |
|---|---|---|---|---|---|
| 8,612,697 | B2* | 12/2013 | Massey | ................. | G06F 3/0608 |
| | | | | | 711/170 |
| 9,110,599 | B1* | 8/2015 | Fair | ....................... | G06F 3/0686 |
| 2003/0120676 | A1* | 6/2003 | Holavanahalli | ..... | G06F 11/1456 |
| | | | | | 714/E11.12 |
| 2004/0148458 | A1* | 7/2004 | Sekine | .................... | G06F 3/061 |
| | | | | | 711/111 |
| 2004/0172421 | A1* | 9/2004 | Saito | ................... | G06F 16/1834 |
| 2007/0266204 | A1* | 11/2007 | Mizuno | ................. | G06F 3/0686 |
| | | | | | 711/111 |
| 2008/0301363 | A1* | 12/2008 | Kitamura | ................ | G06F 3/061 |
| | | | | | 711/111 |
| 2010/0174833 | A1* | 7/2010 | Filer | ........................ | G06F 16/24 |
| | | | | | 707/769 |
| 2010/0218032 | A1* | 8/2010 | Nishijo | ............... | G06F 11/2028 |
| | | | | | 714/E11.071 |
| 2011/0040728 | A1* | 2/2011 | Akirav | .................. | G06F 16/275 |
| | | | | | 707/634 |
| 2011/0208999 | A1* | 8/2011 | Topham | .............. | G06F 11/1456 |
| | | | | | 714/15 |
| 2012/0239891 | A1* | 9/2012 | Bish | ....................... | G06F 12/121 |
| | | | | | 711/159 |
| 2013/0325804 | A1* | 12/2013 | Bachar | ................ | G06F 16/1844 |
| | | | | | 707/634 |
| 2016/0011794 | A1* | 1/2016 | Bish | ....................... | G06F 3/0664 |
| | | | | | 711/111 |
| 2022/0083220 | A1* | 3/2022 | Baruch | ................... | G06F 3/067 |
| 2023/0023416 | A1* | 1/2023 | Baruch | ................... | G06F 3/067 |
| 2023/0236865 | A1* | 7/2023 | Kotov | ................... | G06F 3/0686 |
| | | | | | 703/24 |

OTHER PUBLICATIONS

StackExchange Discussion (2020); https://unix.stackexchange.com/questions/550279/udev-rule-to-trigger-systemd-service; pp. 2 (Year: 2020).*

* cited by examiner

FIG. 7

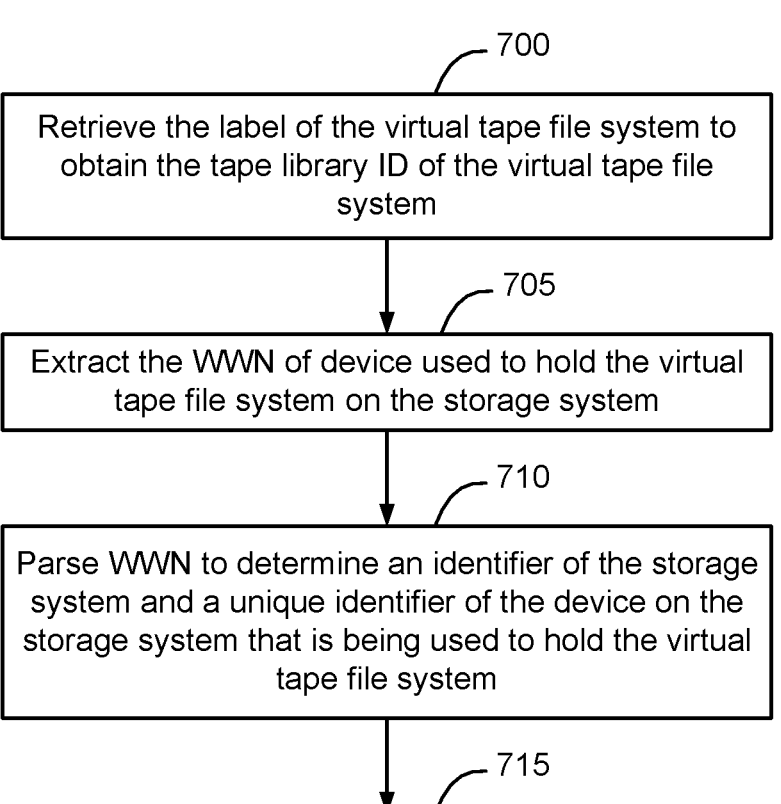

700

Retrieve the label of the virtual tape file system to obtain the tape library ID of the virtual tape file system

705

Extract the WWN of device used to hold the virtual tape file system on the storage system

710

Parse WWN to determine an identifier of the storage system and a unique identifier of the device on the storage system that is being used to hold the virtual tape file system

715

Create label by concatenating the tape library ID, the storage system identifier, and the device identifier of the device on the storage system that is being used to hold the virtual tape file system

LOCATING VIRTUAL TAPE FILE SYSTEMS ON A VIRTUAL TAPE EMULATOR

CROSS-REFERENCE TO RELATED APPLICATIONS

This application claims priority to Russian Patent Application 2022101634, filed Jan. 25, 2022, the content of which is hereby incorporated herein by reference.

FIELD

This disclosure relates to computing systems and related devices and methods, and, more particularly, to a method and apparatus for locating virtual tape file systems on a block storage system on a virtual tape emulator.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, virtual tape emulation software on a Virtual Tape Emulator (VTE) assigns file systems labels based on the tape library name, the logical name of the storage array (from the VTE perspective), and the logical unit number (LUN) of the device on the VTE on which the file system is created. To prevent name conflicts within the VTE Operating System (VTEOS), a UDEV label translation process in the VTEOS creates a new label for the virtual tape file system that will be used by the VTEOS to identify the virtual tape file system. The label is created by concatenating the tape library ID, and the storage system identifier and the device identifier derived from the device World Wide Name (WWN). Since the label is unique within the VTE, UDEV label translation enables the VTEOS to differentiate between multiple replicated copies of the same virtual tape file system.

BRIEF DESCRIPTION OF THE DRAWINGS

FIG. 7 is a flow chart of an example process of locating, by a virtual tape emulator, virtual tape file systems maintained on a block storage system, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
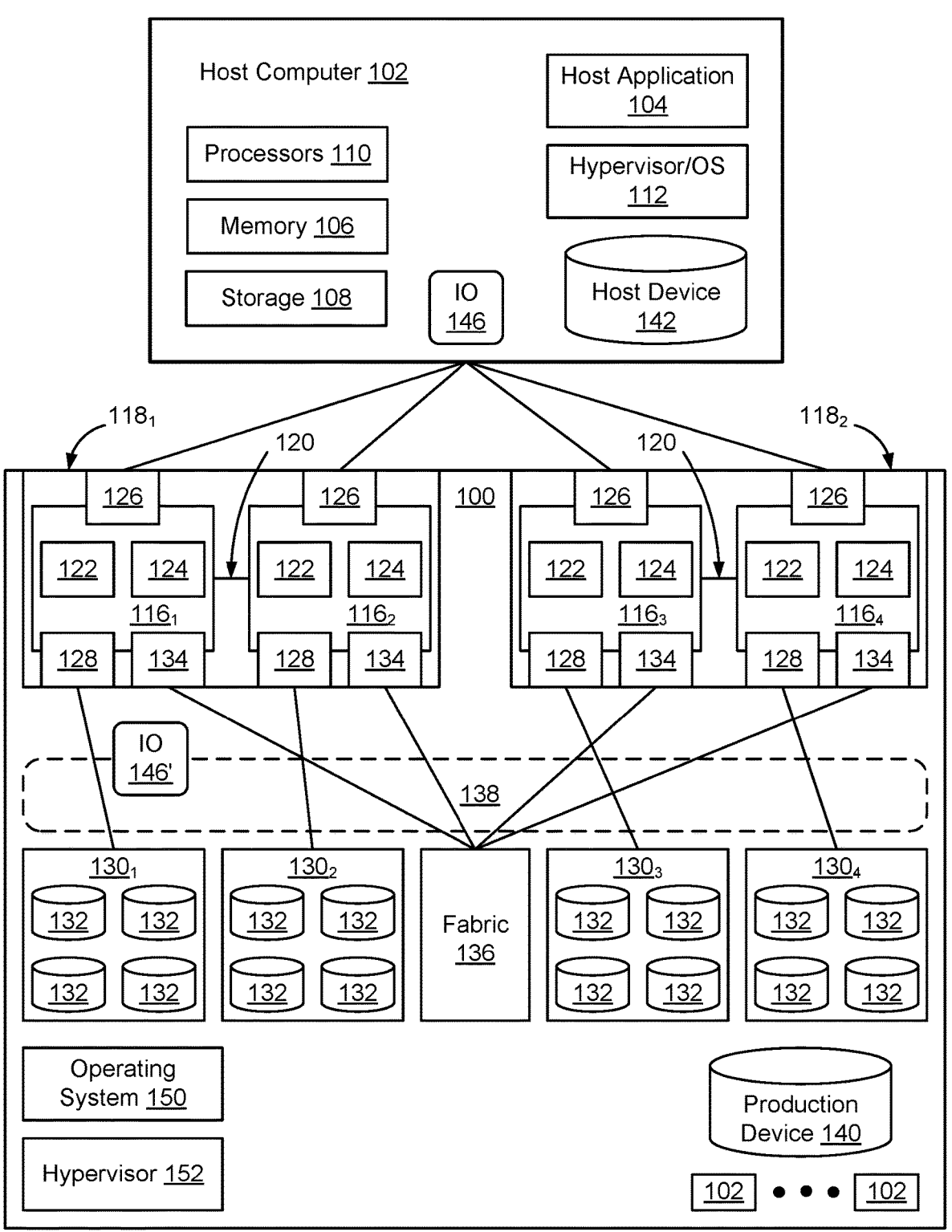
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes 116₁-116₄, possibly including but not limited to storage servers and specially designed compute engines or storage directors for providing data storage services. In some embodiments, pairs of the compute nodes, e.g. (116₁-116₂) and (116₃-116₄), are organized as storage engines 118₁ and 118₂, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines 118₁ and 118₂, which has a pair of (two independent) compute nodes, e.g. (116₁-116₂) or (116₃-116₄). A given storage engine 118 is implemented using a single physical enclosure and provides a logical separation between itself and other storage engines 118 of the storage system 100. A given storage system 100 may include one storage engine 118 or multiple storage engines 118.

Each compute node, 116₁, 116₂, 116₃, 116₄, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node 116₁-116₄ may also include one or more back-end adapters 128 for communicating with respective associated back-end drive arrays 130₁-130₄, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes 116₁-116₄, using a PCIe (Peripheral Component Interconnect Express) bus or may be connected to the compute nodes 116₁-116₄, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes 116₁-116₄ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes 116₁-116₄. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

Some hosts, such as mainframe computers, are configured to store data using magnetic tape data storage. Magnetic tape data storage is a system for storing digital information on magnetic tape using digital recording. Tape was an important medium for primary data storage in early computers. Conventionally, tape drives would be used to write data on customer mainframe computers $205_1$, $205_2$, to physical tapes. Although other forms of storage have been developed which don't involve physical tapes, tape data storage is still used for system backup, data archive, data exchange, and for protection of data against a cyber attack. When data is written to a tape drive, the mainframe computer outputs data using a format developed to be used to store tape data, such as AWSTAPE format. This type of data format, for example, includes a tape mark at the end of each file, and two successive tape marks at the end of the recorded data.

Virtual tape engines have been developed that emulate tape drives. Instead of storing the data on physical tapes, however, the virtual tape engines receive tape formatted data from the hosts and store the tape file systems in storage resources provided by a back-end storage system 100. If the customer mainframe computer 205 subsequently needs to read data from one of the emulated tapes, the virtual tape engine 200 formats the data using the expected format, such as AWSTAPE, and provides the data back to the customer mainframe 205.

Figure 2:
FIG. 2 is a functional block diagram of a set of customer mainframe computers connected to a virtual tape engine configured to emulate tape drives and store tape data on back-end storage systems, according to some embodiments.

FIG. 2 is a functional block diagram of a set of customer mainframe computers $205_1$, $205_2$, connected to a virtual tape engine 200 configured to emulate tape drives and store tape data on one or more back-end storage systems 100 or cloud storage 235, according to some embodiments. The virtual tape engine 200 emulates tape drives so that the customer mainframe computers $205_1$, $205_2$, operate in a conventional manner to write data to the virtual tape engine 200, which appears to the customer mainframe $205_1$, $205_2$ as a conventional tape drive. Specifically, each customer mainframe computer $205_1$, $205_2$ will have one or more virtual tapes $240_1$, $240_2$, $240_3$, $240_4$, that are able to be used by the customer mainframes $205_1$, $205_2$ to store data. When the virtual tapes $240_1$, $240_2$, $240_3$, $240_4$, are used to write data to the virtual tape engine 200, the data output by the mainframe computers $205_1$, $205_2$ is formatted using a tape data format such as AWSTAPE that would conventionally be used to store the file systems on magnetic tape.

The virtual tape engine 200 has a set of virtual tape emulators $210_1$-$210_8$ that emulate tape drives, such as IBM tape drives. The virtual tape emulators 210 interface with the customer mainframe computers and direct tape data to and from back-end storage, which may be provided by one or more attached storage systems 100 or may be provided using cloud storage 235. Data is written to back-end storage and stored in a network file system, for example over fiber channel switches 215. Although FIG. 2 shows a virtual tape engine 200 with 8 virtual tape emulators (VTEs) 210, the virtual tape engine 200 may have a different number of virtual tape emulators 210 depending on the implementation. In some embodiments, each virtual tape emulator 210 is a separate physical component within virtual tape engine 200.

Each virtual tape emulator 210 includes virtual tape emulation software 220 executing in the context of an operating system 245. In some embodiments, the virtual tape emulation software 220 receives and interprets channel command words from the customer mainframe computers 205, sends and receives the tape data records, reads and writes corresponding disk data in response to the command channel words, and sends and receives control information to and from the customer mainframe computers 205 in response to the command channel words.

Tape file systems 230 are organized by the virtual tape emulation software 220 in virtual tape libraries 225. For example, as shown in FIG. 2, storage system 100 has been configured to maintain two virtual tape libraries $225_1$, $255_2$, and cloud storage 235 has been configured to maintain a third virtual tape library $2253$. Each virtual tape library 225 has one or more virtual tape file systems 230.

In some embodiments, virtual tape emulation software 220 initializes new file systems on block storage with labels constructed from the tape library name, the logical name of the storage array (from the perspective of the virtual tape engine 200) (e.g. Storage System #1 or Storage System #2), and the logical unit number (LUN) of the device which the file system is created on. Labeling is crucial for the proper operation of the virtual tape emulation software 220 because the virtual tape emulation software 220 needs to know which tape library the file system belongs to.

Unfortunately, there are instances where the naming convention used by the virtual tape emulation software 220 can cause a conflict in the underlying operating system 245, such that multiple file systems 230 on block storage are assigned the same label in the virtual tape emulator 210 operating system 245, for example where a file system 230 with a given label is cloned.

An example of such case is typical disaster recovery (DR) testing scenario performed by the customer. Such scenario involves creating a local replica of the virtual tape file system 230 on the block storage array. After that, some test workload is run on the replica to simulate working with the system in case of a disaster recovery event.

However, because the label used by the VTE software 220 to identify the virtual tape file system 230 is stored within the structure of the virtual tape file system 230 itself, creating an exact replica of the virtual tape file system 230 will cause the VTE software 220 to mount a device in the operating system 245 that has the same label as the original device. The underlying SUSE Linux operating system (OS) 245 on top of which virtual tape emulation software 220 runs uses a single namespace for file system labels, so only one of the file systems sharing the same label can be accessible to the virtual tape emulation software 220 at a time. While the devices can still be addressed by other identifiers (e.g., the device WWN), such addressing does not maintain an association between the file system 230 and the virtual tape library 235, which is required for proper functioning of the VTE software 220.

Figure 3A:
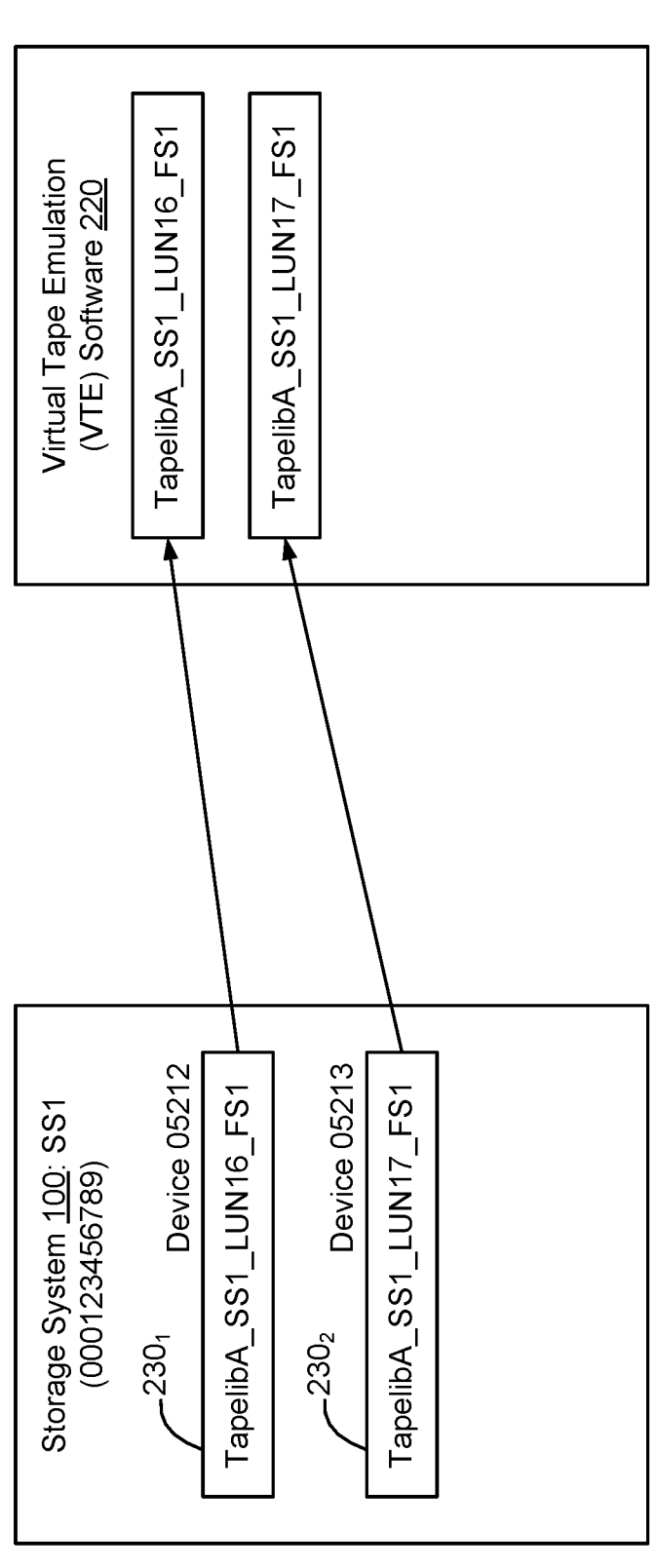
FIGS. 3A and 3B are functional block diagrams showing an example name conflict that can occur in a virtual tape emulator in connection with file system replication on a back-end storage system.
Figure 3B:
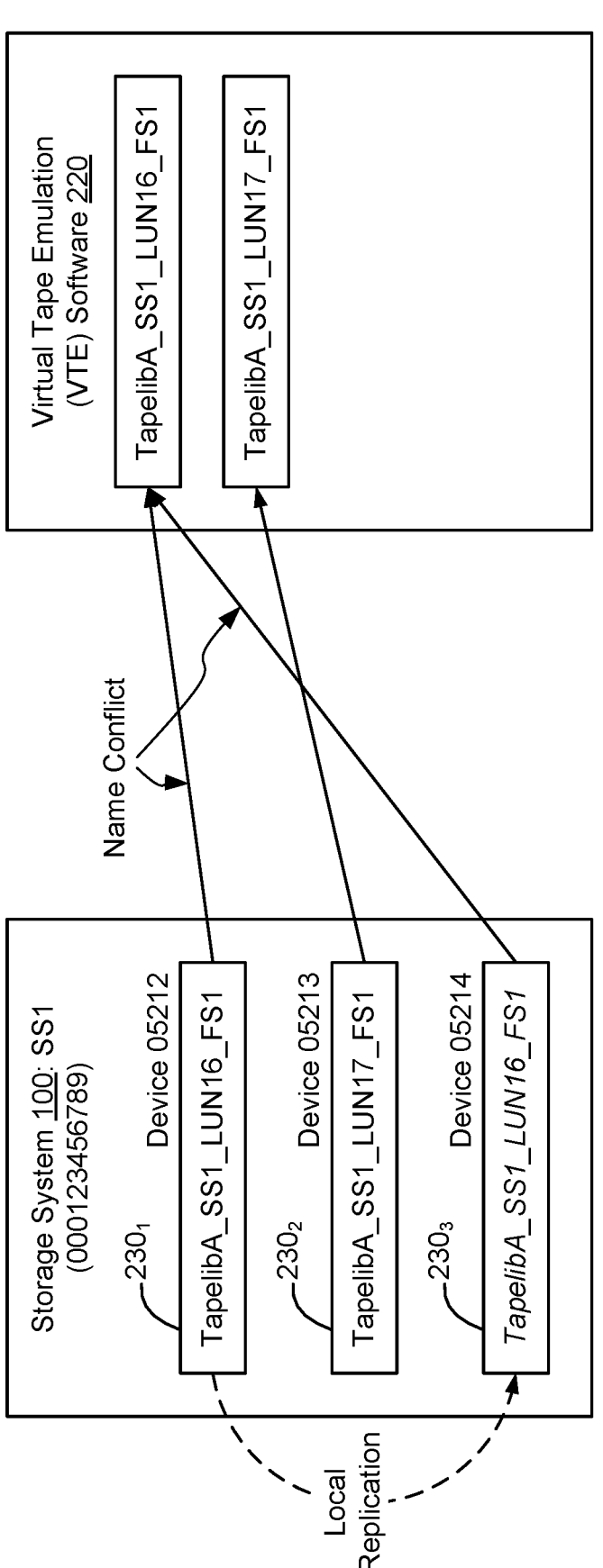

FIGS. 3A and 3B are functional block diagrams showing an example of this type of name conflict that can occur in a virtual tape emulator 210, in connection with file system replication on a back-end storage system, for example in connection with disaster recovery testing. As shown in FIG. 3A, initially two virtual tape file systems $230_1$, $230_2$ have been created on storage system number 1 (SS1). In this example, storage system SS1 has been assigned a storage system serial number 000123456789. The two virtual tape file systems $230_1$, $230_2$ have been labeled TapelibA_SS1_LUN16_FS1 and TapelibA_SS1_LUN17_FS1 by virtual tape emulation software 220. In this naming convention, "TapelibA" identifies the file system to the virtual tape emulation software as belonging to tape library A. SS1 is the name of the storage system (from the perspective of the VTE software 220) that is being used to hold the file system. The LUN number is the identity of the Logical Unit Number (LUN) of the logical device on the virtual tape emulator 210 that has been mounted to be used by the virtual tape emulation software 220 to read and write data to the file system 230.

As shown in FIG. 3B, if a customer replicates a virtual tape file system on storage system 100, for example to perform typical disaster recovery (DR) testing in the scenario described above, the replicated file system will be presented to the virtual tape emulation software 220 as a new file system 230 to be managed.

When a new file system creation is requested on the virtual tape emulator 210 attached to a storage system 100, the virtual tape emulation software 220 creates a partition on the storage system 100 and initializes the new file system in the partition with the following label: TapeLibrary{x}_StorageSystem{n}_LUN{m}_FS{p}, where {x} is the name of the tape library, {n} is the logical number of the Storage System connected to the virtual tape engine 200 (n is typically 1 but can also be another number depending on the implementation); {m} is the logical unit number (LUN) of the device on the virtual tape emulator 210 on which the file system resides; and {p} is the logical number of the file system within this device. In some embodiments, the virtual tape emulation software 220 only allows one file system per device (per LUN), but the exact number of file systems {p} per device may vary depending on the implementation. Once a label has been assigned to a tape file system, the label is not supposed to change during the lifetime of the file system 230.

Unfortunately, as shown in FIG. 3B, using this labeling convention can result in a name conflict when local replication of a virtual tape file system occurs on the backend storage system 100, such that the virtual tape emulator 210 is not able to uniquely identify multiple copies of the same file system using this naming system.

Figure 4:
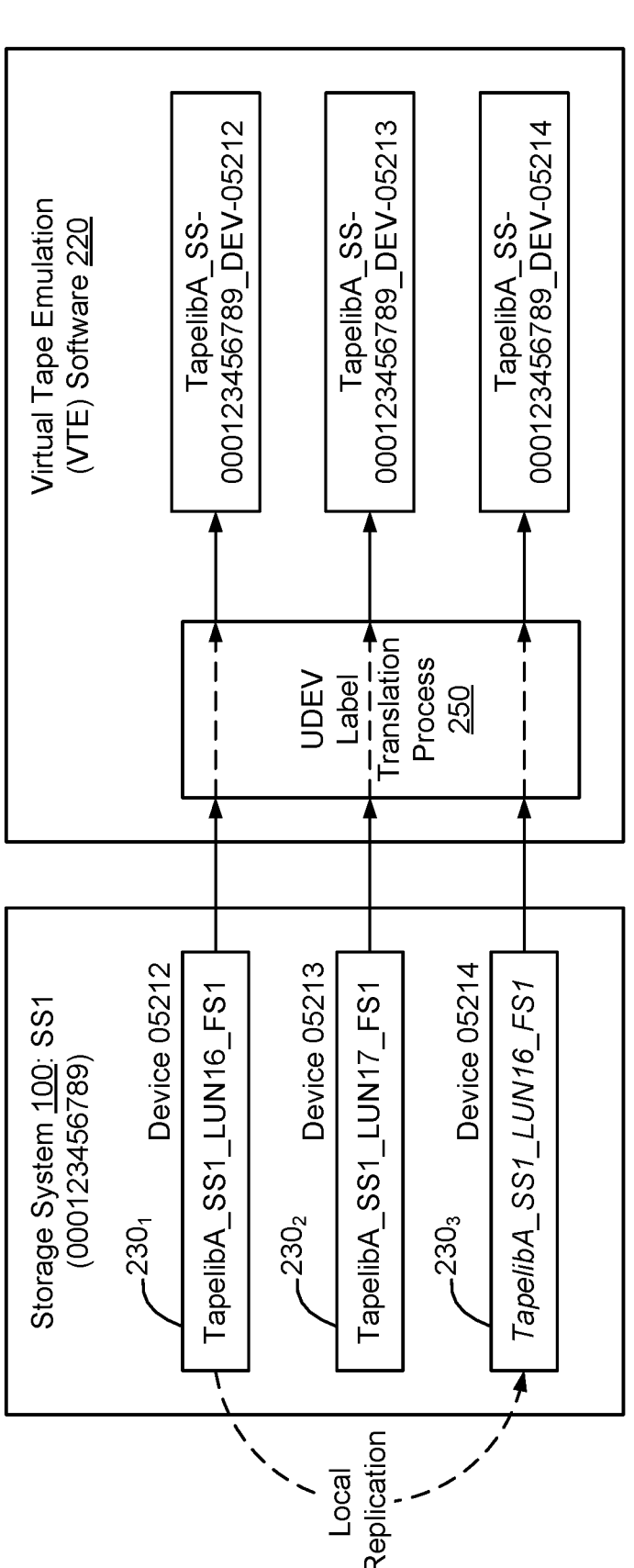
FIG. 4 is a functional block diagram showing resolution of the example name conflict shown in FIGS. 3A-3B using virtual tape file system label translation, according to some embodiments.

FIG. 4 is a functional block diagram showing resolution of the example name conflict shown in FIGS. 3A-3B using virtual tape file system label translation, according to some embodiments. As shown in FIG. 2, in some embodiments the virtual tape emulator 210 has a UDEV label translation process 250 running within the context of the UDEV daemon 260 provided by the operating system 245. The UDEV daemon 260 is a device manager for the Linux kernel that primarily manages device nodes in the/dev directory of the operating system. In some embodiments, the UDEV label translation process 250 runs in systemd, which is an init system of the Linux operating system that is located in userspace that is technically outside of the OS kernel. However, since the init system is part of the operating system core, in some embodiments the UDEV label translation process 250 may be considered to be implemented as part of the OS kernel. Although some embodiments are described in which the UDEV label translation process 250 is implemented in the context of a Linux operating system 245, it should be realized that the UDEV label translation process 250 could similarly be implemented in virtual tape emulators 210 that are running other types of operating systems, depending on the implementation.

In some embodiments, the UDEV label translation process 250 translates the label generated by the virtual tape emulation software 220 into a unique label when a device that will be used to access the virtual tape file system 230 is discovered by the kernel of the operating system 245. The label may then be used at any later point in time when the device is mounted to the virtual tape emulator 210 for use by the virtual tape emulation software 220 to access a file system 230. The UDEV label translation process 250 provides dynamic virtual tape file system label translation to ensure that all file systems 230 residing on all attached block storage arrays have unique labels while preserving tape library associations. This is achieved by generating new labels which are composed using the block storage serial number (e.g. the serial number of the storage system 100), the device identifier within the storage system that is used to store the virtual tape file system, which is unique within a given storage system, and the tape library identifier. The label generation is done on the fly whenever a new device is detected by the virtual tape emulator 210 OS 245.

For example, as shown in FIG. 4, the naming convention used by the virtual tape emulation software 220 assigns the file system 230₁ that is residing in device 05212 the label TapelibA_SS1_LUN16_FS1. According to some embodiments, when the OS 245 detects a device that will be used by the virtual tape emulation software 220 to access the file system 230₁, the UDEV label translation process 250 dynamically creates a new label for this virtual tape file system based on the tape library (TapelibA), the Storage System ID (000123456789) and the device ID (05212). This new label is subsequently used during the mount process to make the content of the virtual tape file system available to the operating system 245 processes, including the virtual tape emulation software 220. Accordingly, using the UDEV label translation process 250, each file system on the virtual tape emulator 210 is assigned a unique label, which enables multiple copies of the same file system 230 to be uniquely accessed through the virtual tape emulator 210 operating system 245. For example, as shown in FIG. 4, the new label for the replicated file system that is stored on storage system 1 in device 05214 is TapelibA_SS-000123456789_DEV-05212, which is unique within virtual tape emulator 210, and does not require modification to the manner in which the virtual tape emulation software 220 names file systems.

Figure 5A:
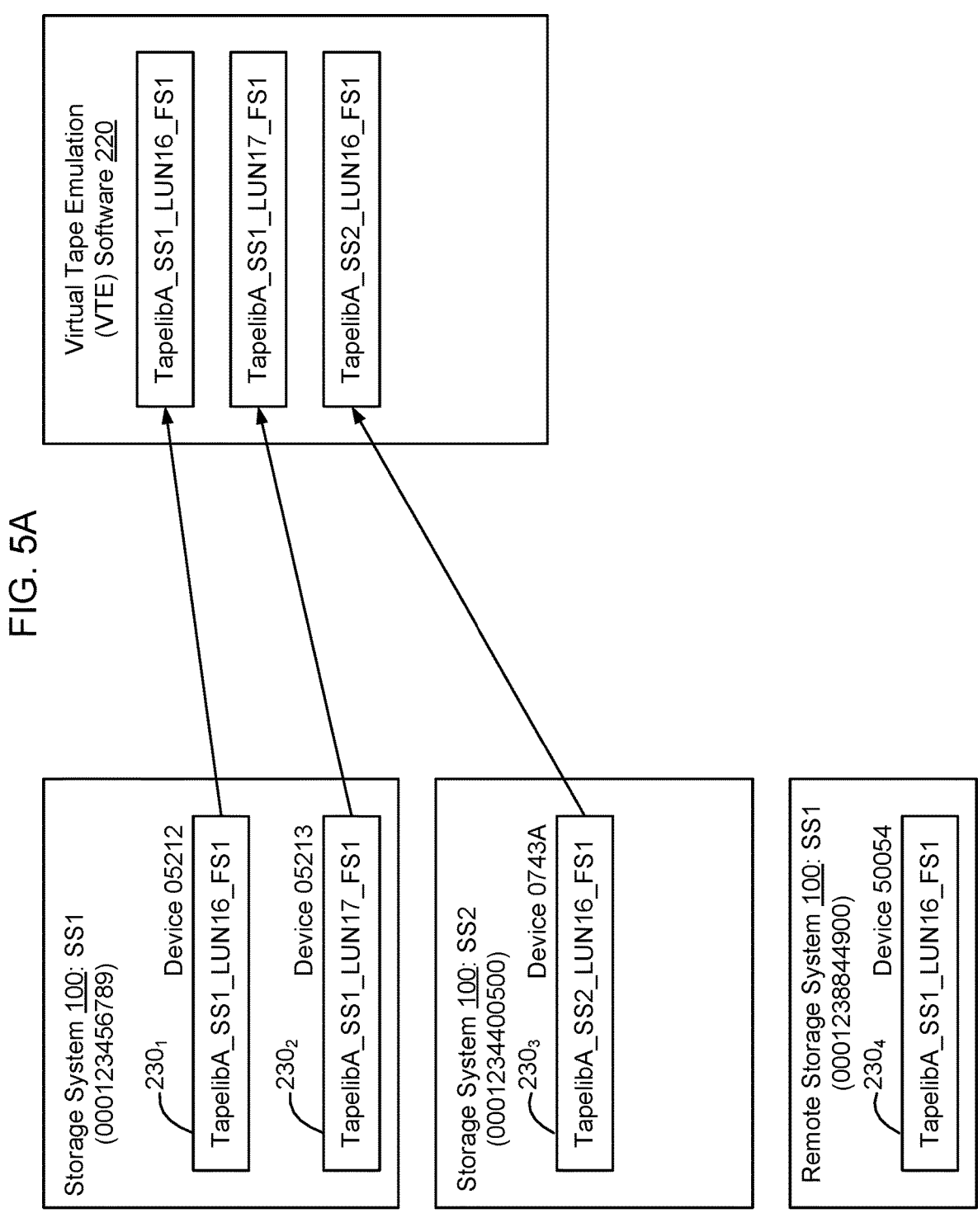
FIGS. 5A and 5B are functional block diagrams showing an example name conflict that can occur in a virtual tape emulator in connection with file system reproduction between back-end storage systems.
Figure 5B:
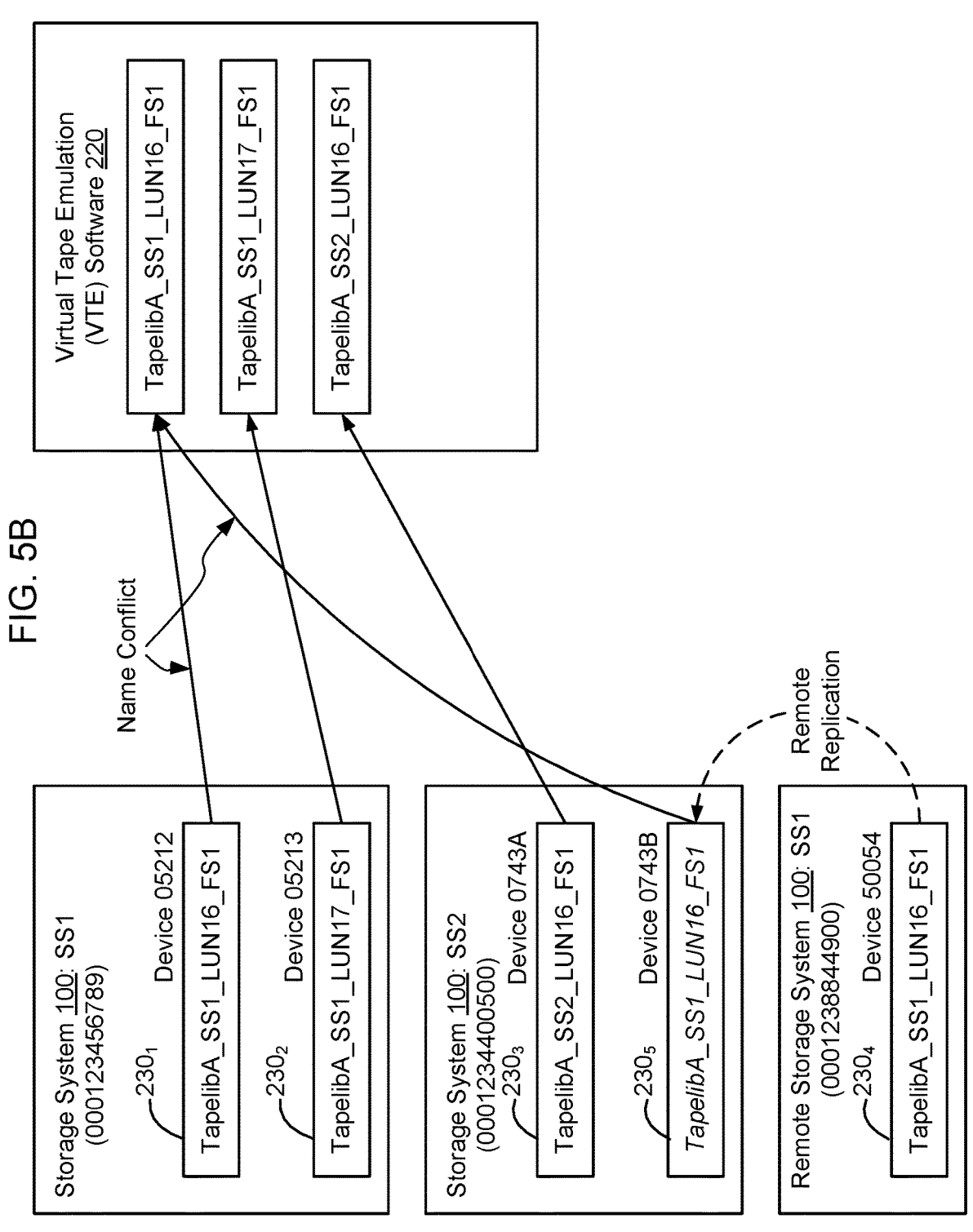

FIGS. 5A and 5B are functional block diagrams showing another example name conflict that can occur in a virtual tape emulator 210 in connection with file system reproduction between back-end storage systems 100.

As shown in FIG. 5A, initially two virtual tape file systems 230₁, 230₂ have been created on storage system SS1. The two virtual tape file systems have been labeled TapelibA_SS1_LUN16_FS1 and TapelibA_SS1_LUN17_FS1, in which "TapelibA" identifies the file system, to the virtual tape emulation software 220, as belonging to tape library A, SS1 is the name of the storage system 100 (from the perspective of the VTE software), and the LUN number is the identity of the Logical Unit Number (LUN) mounted in the operating system 245 that the virtual tape emulation software 220 uses to hold the data of the virtual tape file. When data is written to the LUN, the virtual tape emulator 210 writes the data out to a device on storage system 100 or on cloud storage 235. In FIG. 5, a third virtual tape file system 230₃ has been created on storage system 100 SS2. The third virtual tape file system 230₃ has been labeled TapelibA_SS2_LUN16_FS1.

In an environment where multiple virtual tape engines 200 are separately providing virtual tape emulation services to different customer mainframe computers 205, it is possible that the virtual tape file systems 230 may be replicated between storage systems 100. For example, as shown in FIG. 5B, if a virtual tape file system 230₄ has been created on a remote storage system 100, that has also been named SS1 by its respective virtual tape engine 200, when the virtual tape file system 230₄ is replicated to storage system SS2 as virtual tape file system 230₅, there is a possibility that a name conflict will exist such that multiple virtual tape file systems have the same label.

This may cause problems if the local storage system, that has been labeled "SS1" by its current virtual tape engine 200, exports both local file systems and the file systems replicated from a remote storage system, to the virtual tape emulator 210. In embodiments where LUNs are assigned to devices exported to a virtual tape engine 200 sequentially, e.g. starting from 16 (hexadecimal 0x10), the probability of label collision in such situations is pretty high.

Figure 6:
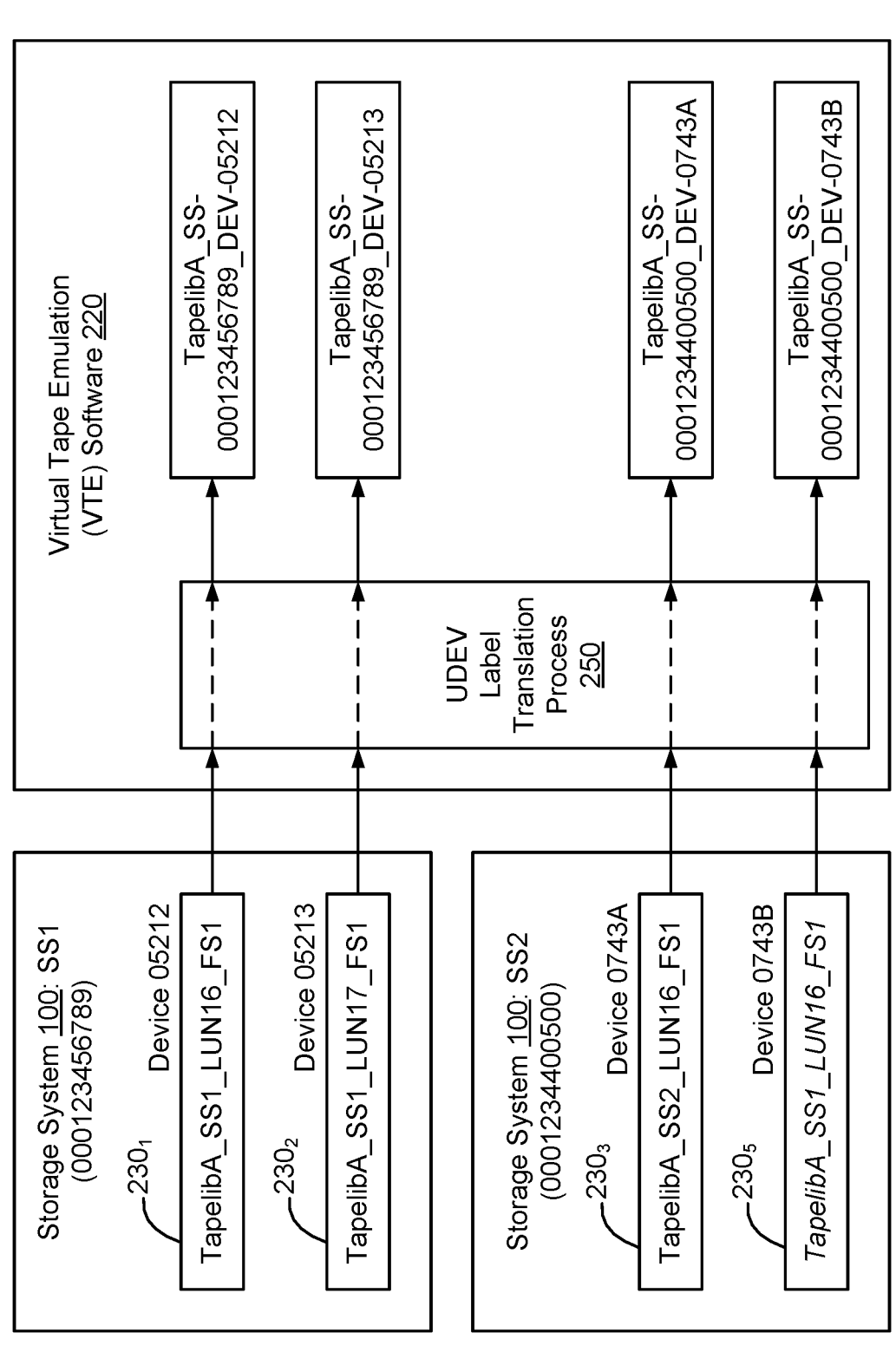
FIG. 6 is a functional block diagram showing resolution of the example name conflict shown in FIGS. 5A-5B using virtual tape file system label translation, according to some embodiments.

FIG. 6 is a functional block diagram showing resolution of the example name conflict shown in FIGS. 5A-5B using virtual tape file system label translation, according to some embodiments. As shown in FIG. 6, in some embodiments the virtual tape emulator 210 has a UDEV label translation process 250 running within the context of the operating system 245. The UDEV label translation process 250 translates the label generated by the virtual tape emulation software 220 when the OS 245 detects a device that will be used to make the virtual tape file system available to the operating system processes such as the virtual tape emulation software 220. In some embodiments, the labels generated by the UDEV label translation process are unique, and based on the serial number of the storage system that is being used to store the file system, the device identifier of the device on the storage system that is used to hold the file system (which is unique within a given storage system), and the tape library. Label generation is done on the fly whenever a new device is detected by the operating system 245 of the virtual tape emulator 210.

For example, as shown in FIG. 5B, the virtual tape file system that is residing in device 05212 previously was labeled TapelibA_SS1_LUN16_FS1 by the virtual tape emulator 210. As shown in FIG. 6, the UDEV label translation process 250 dynamically creates a new label for this virtual tape file system based on the tape library (TapelibA), the Storage System ID (000123456789) and the device ID (05212) to create a new label: TapelibA_SS-000123456789_D EV-05212.

Accordingly, when file system reproduction occurs, the new file system will be stored in a different device on the storage system SS2. Since each device on the storage system 100 will have a unique device ID (on that storage system), the new label for the newly created file system 230$_5$ will be TapelibA_SS-0001234400500_DEV-0743B. Accordingly, using UDEV label translation process 250, it is possible to create unique labels for each virtual tape file system mounted in virtual tape emulator 210 operating system 245, without requiring the virtual tape emulation software 220 to adopt a new naming convention in connection with managing the virtual tape file systems 230.

FIG. 7 is a flow chart of an example process of locating, by a virtual tape emulator 210, virtual tape file systems maintained on a block storage system, according to some embodiments. As shown in FIG. 7, in some embodiments the UDEV label translation process 250 retrieves the label of the virtual tape file system 230 from the storage system 100 to obtain the tape library ID of the virtual tape file system (block 700). The UDEV label translation process 250 extracts the World-Wide Identifier (WWN) of the device used by the storage system 100 to hold the virtual tape file system (block 705). The UDEV label translation process 250 parses the device WWN to determine an identifier of the storage system, and a unique identifier of the production device 140 on the storage system 100 that is being used to hold the virtual tape file system 230. In some embodiments, the identifier of the storage system 100 is a combination of a company identifier that manufactured the storage system 100 and a serial number of the storage system assigned by the manufacturer.

The UDEV label translation process 250 then creates a label for the virtual tape file system when a device that will be used by the processes executing in the context of the operating system 245 to access the file system is being discovered by the kernel. The label may subsequently be used to mount the device at any later point in time. In some embodiments, the label is created by concatenating the tape library ID, the storage system identifier, and the device identifier of the device on the storage system that will be used to hold the virtual tape file system. Since the label is unique within the virtual tape emulator 210, using a UDEV label translation process 250 prevents virtual tape file system label collisions to thus enable multiple copies of a given virtual tape file system to be accessed by the virtual tape emulation software 220.

Figure 8:
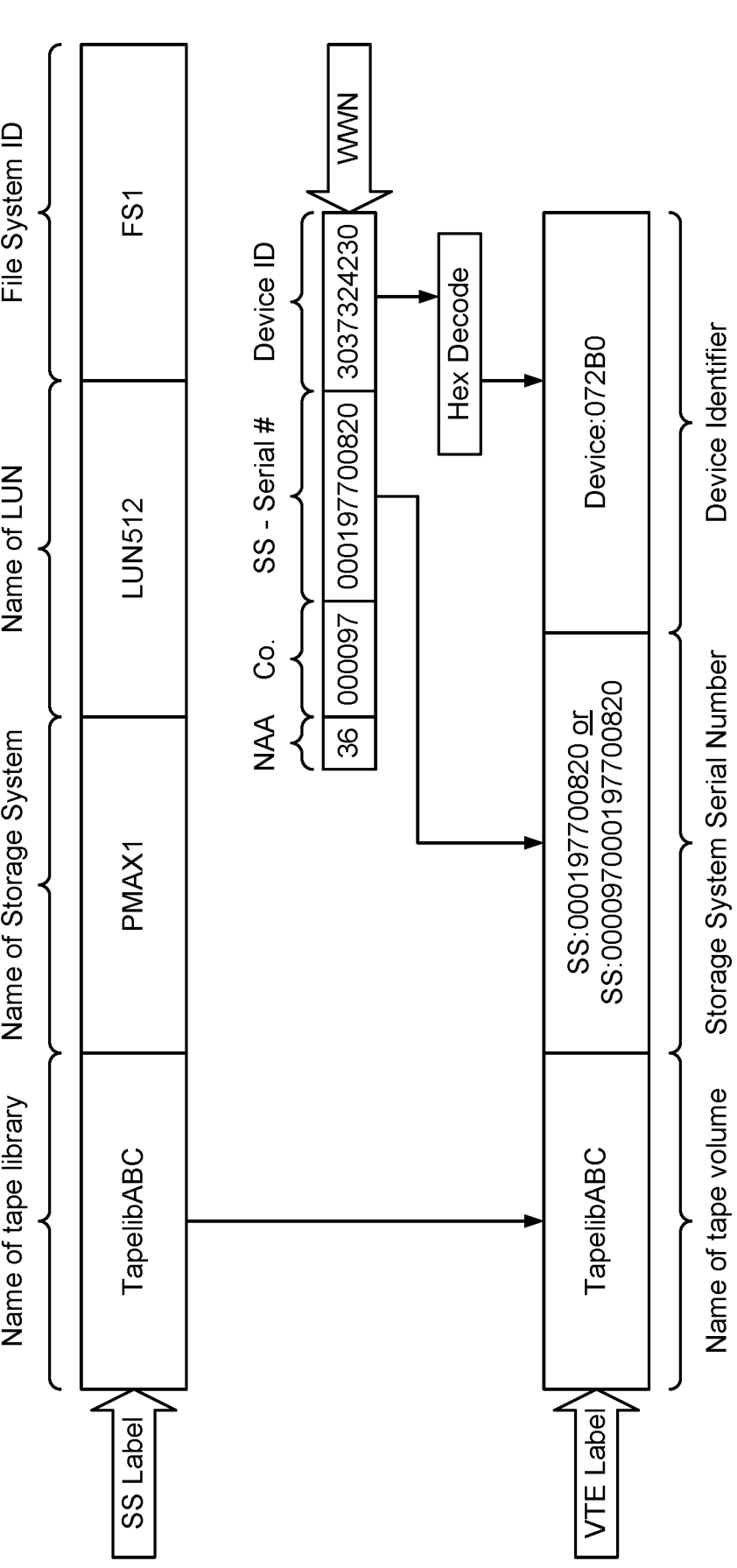
FIG. 8 is a functional block diagram of an example virtual tape file system label translation process configured to preserve tape library identification while ensuring uniqueness of the file system name within the virtual tape emulator, according to some embodiments.

FIG. 8 is a functional block diagram of an example virtual tape file system label translation process configured to preserve tape library identification while ensuring uniqueness of the file system name within the virtual tape emulator 210, according to some embodiments. In FIG. 8, the label assigned by the virtual tape emulation software 220 is shown on top, and the label created by the UDEV label translation process 250 is shown on the bottom.

As shown in the top portion of FIG. 8, in some embodiments the virtual tape emulation software creates labels for virtual tape file systems using the name of the tape library (e.g. TapelibABC) the name of the storage system 100 (the point of view of the virtual tape emulator 210) that will be used to hold the virtual tape file system (e.g. PMAX1), the name of the logical device 140 (LUN) on the storage system 100 where the virtual tape file system is stored (e.g. LUN512), and the file system ID (FS1).

As shown in the bottom portion of FIG. 8, in some embodiments the UDEV label translation process 250 retrieves the original virtual tape file system label and extracts the name of the tape library (TapelibABC) from the original virtual tape file system label. The UDEV label translation process retrieves the WWN of the device used by the storage system to hold the virtual tape file system, and parses the WWN to extract the storage system serial number (000197700820) and device ID (072B0) of the device on the storage system that will be used to hold the virtual tape file system. These three values are then concatenated, to create the new label that is used to identify the file system in the virtual tape emulation software 220. The storage system serial number may be derived from the serial number of the storage system only (e.g. 000197700820), or may also include the company code (e.g. 000097) that identifies the company that manufactured the storage system depending on the implementation (e.g. 000097000197700820).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for locating virtual tape file systems on a virtual tape emulator, the computer program including a set of instructions which, when executed by a computer, cause the computer to perform a method comprising the steps of:

receiving a virtual tape file system label assigned to a virtual tape file system by virtual tape emulation software executing on the virtual tape emulator, the virtual tape file system label including a virtual tape library identifier associated with the virtual tape file system;

identifying a world-wide identifier (WWN) of a device used to store the virtual tape file system by a storage system providing storage resources to the virtual tape emulator; and creating a unique label for the virtual tape file system for use during a mount process of virtual tape file system contained on a storage device to an operating system of the virtual tape emulator, the storage device being used by processes operating in the context of the operating system to access the virtual tape file system, the unique label for the virtual tape file system including:

the virtual tape library identifier extracted from the virtual tape file system label assigned by the virtual tape emulation software;

a serial number of the storage system providing storage resources to the virtual tape emulator; and a device identifier of a storage system device used to store the virtual tape file system by the storage system;

wherein the step of creating the unique label for the virtual tape file system is implemented by a label translation process running in the operating system, and prevents name conflicts within the operating system enabling the operating system to differentiate between multiple replica copies of the same virtual tape file system within the same virtual tape library.

2. The non-transitory tangible computer readable storage medium of claim 1, wherein the step of creating the unique label comprises extracting the serial number of the storage system from the WWN of the storage system device and extracting the device identifier from the WWN of the storage system device.

3. The non-transitory tangible computer readable storage medium of claim 2, wherein the unique label is created by concatenating the virtual tape library identifier, the serial number of the storage system and the device identifier of the storage system device.

4. The non-transitory tangible computer readable storage medium of claim 1, wherein the step of creating the unique label for the virtual tape file system is implemented by the label translation process running in a device manager of the operating system.

5. The non-transitory tangible computer readable storage medium of claim 1, wherein the steps of receiving the virtual tape file system label, identifying the WWN of the device, and creating the unique label for the virtual tape file system, are implemented by the label translation process running in a device manager in a kernel of the operating system.

6. The non-transitory tangible computer readable storage medium of claim 1, wherein the step of creating the unique label for the virtual tape file system is implemented by the label translation process running in an init system that is part of an operating system core of the operating system.

7. The non-transitory tangible computer readable storage medium of claim 6, wherein the operating system is a Linux operating system and the init system is systemd.

8. The non-transitory tangible computer readable storage medium of claim 1, wherein the virtual tape emulator is configured to emulate tape drives and is configured to receive and output data from and to attached hosts in tape data format.

9. The non-transitory tangible computer readable storage medium of claim 8, wherein the tape data format is AWSTAPE.

10. A method of locating virtual tape file systems on a virtual tape emulator, comprising the steps of:

receiving a virtual tape file system label assigned to a virtual tape file system by virtual tape emulation software executing on the virtual tape emulator, the virtual tape file system label including a virtual tape library identifier associated with the virtual tape file system;

identifying a world-wide identifier (WWN) of a device used to store the file system by a storage system providing storage resources to the virtual tape emulator; and creating a unique label for the virtual tape file system for use during a mount process of a virtual tape file system contained on a storage device to an operating system of the virtual tape emulator, the storage device being used by processes operating in the context of the operating system to access the virtual tape file system, the unique label for the virtual tape file system including:

the virtual tape library identifier extracted from the virtual tape file system label assigned by the virtual tape emulation software;

a serial number of the storage system providing storage resources to the virtual tape emulator; and a device identifier of the device used to store the file system by the storage system;

wherein the step of creating the unique label for the virtual tape file system is implemented by a label translation process running in the operating system, and prevents name conflicts within the operating system enabling the operating system to differentiate between multiple replica copies of the same virtual tape file system within the same virtual tape library.

11. The method of claim 10, wherein the step of creating the unique label comprises extracting the serial number of the storage system from the WWN of the storage system device and extracting the device identifier from the WWN of the storage system device.

12. The method of claim 11, wherein the unique label is created by concatenating the virtual tape library identifier, the serial number of the storage system and the device identifier of the storage system device.

13. The method of claim 10, wherein the step of creating the unique label for the virtual tape file system is implemented by the label translation process running in a device manager of the operating system.

14. The method of claim 10, wherein the steps of receiving the virtual tape file system label, identifying the WWN of the device, and creating the unique label for the virtual tape file system, are implemented by the label translation process running in a device manager in a kernel of the operating system.

15. The method of claim 10, wherein the step of creating the unique label for the virtual tape file system is implemented by the label translation process running in an init system that is part of an operating system core of the operating system.

16. The method of claim 15, wherein the operating system is a Linux operating system and the init system is systemd.

17. The method of claim 10, wherein the virtual tape emulator is configured to emulate tape drives and is configured to receive and output data from and to attached hosts in tape data format.

18. The method of claim 17, wherein the tape data format is AWSTAPE.

\* \* \* \* \*